A. J. CUNNINGHAM.
KITCHEN AND TABLE ARTICLE.
APPLICATION FILED JUNE 12, 1917.
1,305,777.
Patented June 3, 1919.
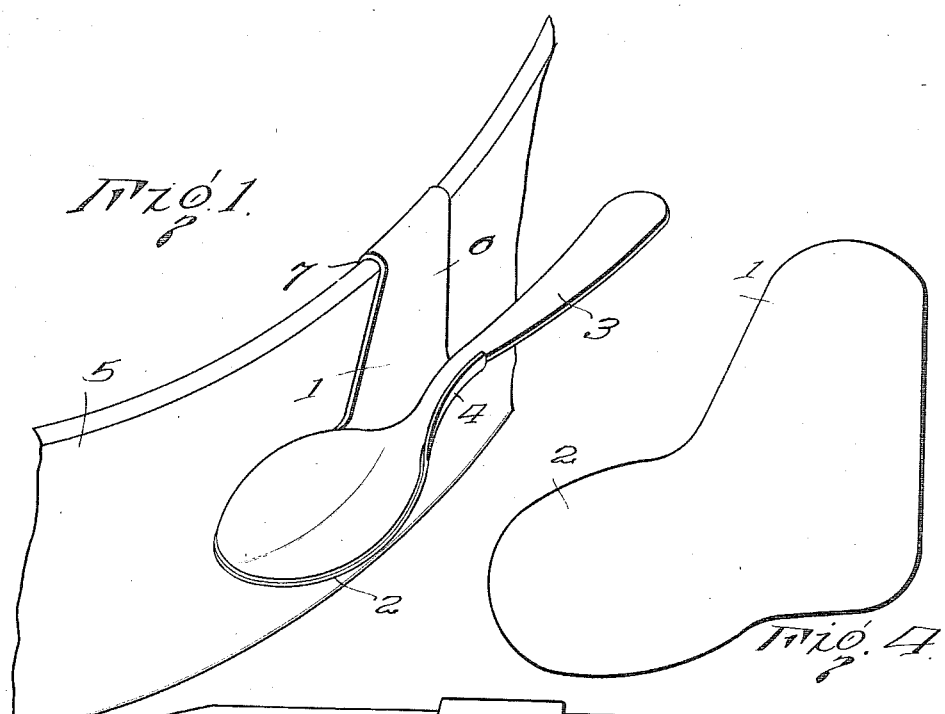
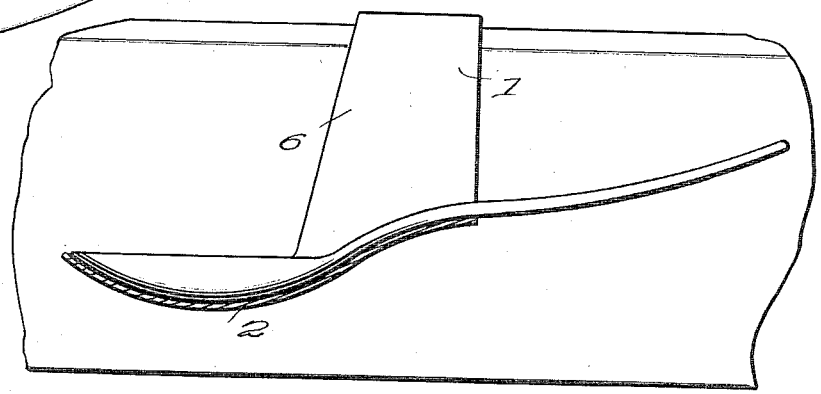
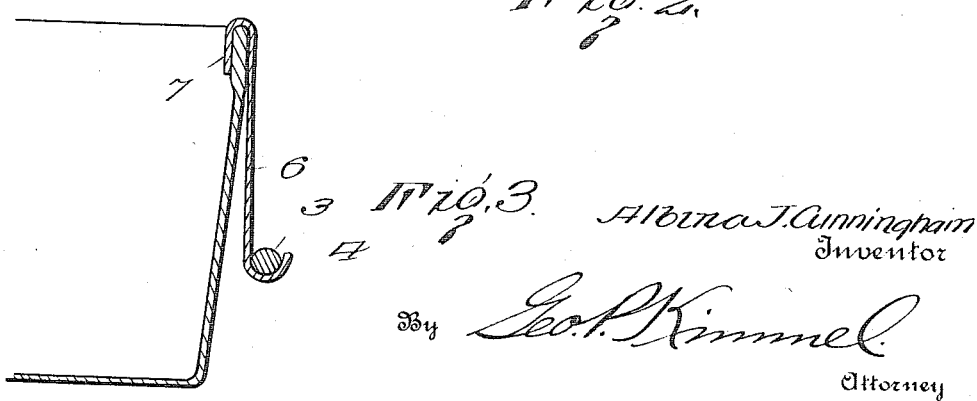
Albina J. Cunningham
Inventor
By Geo. P. Kimmel
Attorney

UNITED STATES PATENT OFFICE.

ALBINA J. CUNNINGHAM, OF BRIDGEWATER, MASSACHUSETTS.

KITCHEN AND TABLE ARTICLE.

1,305,777.  Specification of Letters Patent.  Patented June 3, 1919.

Application filed June 12, 1917. Serial No. 174,251.

*To all whom it may concern:*

Be it known that I, ALBINA J. CUNNINGHAM, a citizen of the United States, and resident of Bridgewater, in the county of Plymouth and State of Massachusetts, have invented certain new and useful Improvements in Kitchen and Table Articles, of which the following is a specification.

This invention relates to new and useful improvements in kitchen and table articles, and it is the primary object of the invention to provide a novel spoon rest adapted to be arranged over the marginal edge of a receptacle, such as a bowl, pan, etc., whereby after the spoon has been used the same may be supported adjacent the side of the receptacle when not in use, and the material that adheres thereto will be prevented from falling onto the table or the like.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claim.

In the accompanying drawings:—

Figure 1 is a perspective view of the device applied;

Fig. 2 is a side elevaton of the same;

Fig. 3 is a vertical transverse section; and

Fig. 4 is a plan view of the blank from which the article is formed.

In describing my invention I shall refer to the drawings in which similar reference characters designate corresponding parts throughout the several views. The article is formed from the single blank preferably of metal, as indicated by the numeral 1 the material from which the same is formed being adapted to be bent in the various shapes as will be hereinafter more fully set forth.

The blank 1 is formed with a bowl shaped body portion 2, which is adapted to receive the bowl portion of a spoon 3, and said bowl shaped body portion has a trough shaped passage 4 communicating therewith at one end, the other end of said passage being open. The bowl shaped body portion of the holder may be of such size as to receive therein spoons of various sizes, and the trough adjacent the communicating passage is of corresponding size, and is adapted to receive the adjacent end of the handle of said spoon, as clearly shown in Figs. 1 and 2 of the drawings.

The holder is supported in position adjacent the side of a receptacle 5, by having one of the sides of the trough shaped portion, the inner side, extending upwardly as shown at 6, with its extremity bent back upon itself as shown at 7 in parallel spaced relation. This will form a hook adapted to engage the marginal edge of the receptacle 5.

In operation when the device is arranged over the marginal edge of the receptacle, the bowl shaped body portion, and communicating passage will be disposed substantially horizontally with respect to the outer side of said receptacle. The hooked shaped support will engage the inner portion of the marginal edge of said receptacle, and hold the various other parts of the holder in the aforesaid position. When a spoon or the like is removed from the receptacle, the bowl portion of the spoon is placed in the body portion of the holder, and the adjacent end of the handle of the spoon will consequently drop into the communicating passage 4. This passage is of sufficient length to support the handle, as shown in Figs. 1 and 2 of the drawings. Owing to the position of the spoon, dripping or falling off of the contents of the spoon onto the table will be obviated. Owing to the fact that the holder is formed from a single blank, the same may be very economically constructed and will be very efficient in operation.

From the above description taken in connection with the accompanying drawings, it is thought that a clear and comprehensive understanding of the construction, operation and advantages of my invention may be had, and while I have shown and described the device as embodying a specific structure, I desire to have it understood that such changes may be made in said structure as do not depart from the spirit and scope of the invention as claimed.

Having fully described my invention, what I claim as new and desire to secure by Letters Patent, is:—

As a new article of manufacture a holder of the class described initially substantially in L-shape with one arm folded to form a supporting hook and the other arm pressed into bowl shape and with the juncture of the arms bent into trough shape, the hooked portion adapted to engage over the edge of a dish, the bowl shaped portion adapted to receive the bowl of the spoon, and the trough shaped portion adapted to receive the handle of the spoon.

In testimony whereof, I affix my signature hereto.

ALBINA J. CUNNINGHAM.